March 26, 1946.  O. E. FISHBURN  2,397,344
SYNCHRONIZER MECHANISM
Filed May 19, 1944  2 Sheets-Sheet 2
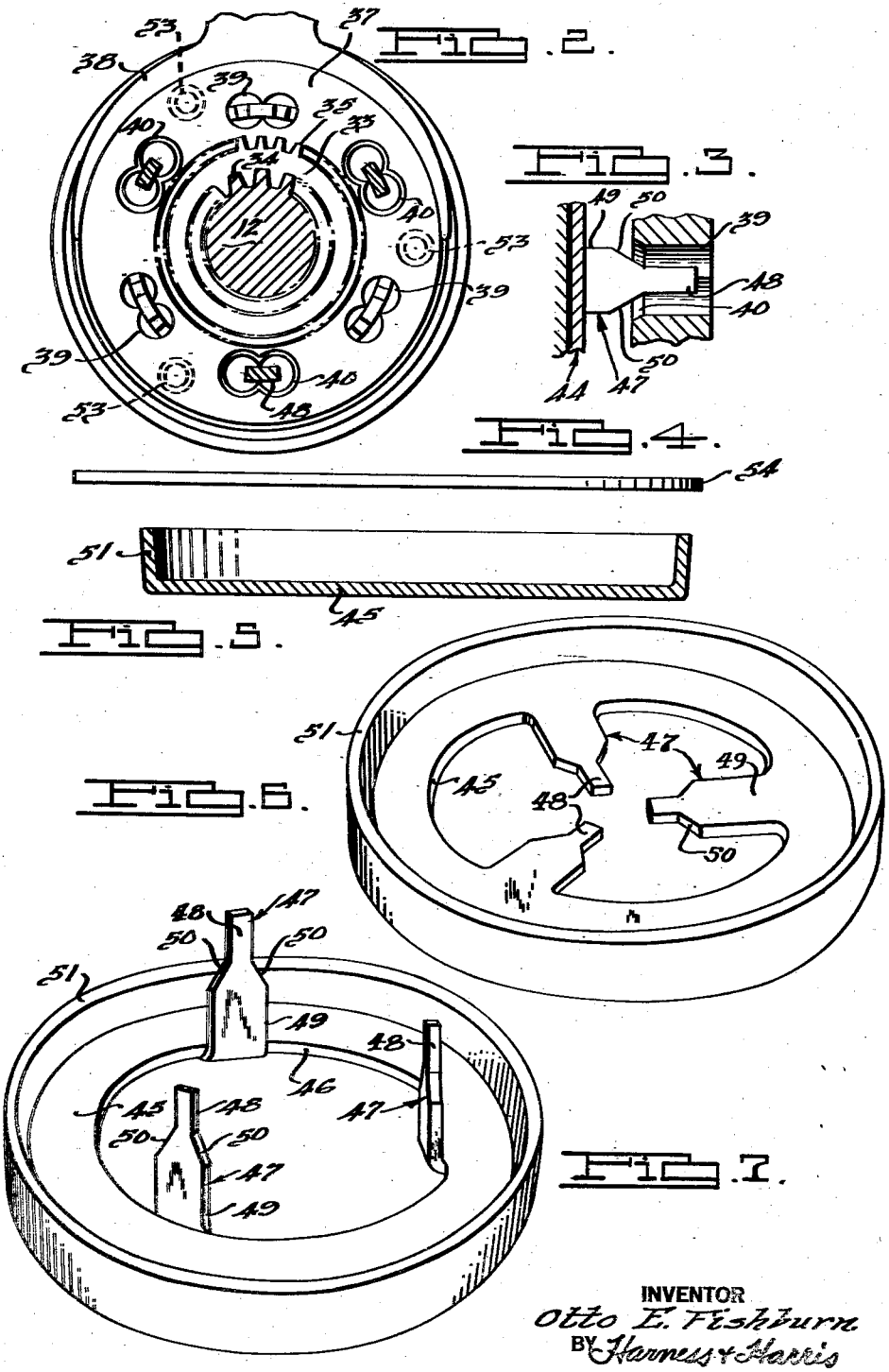
INVENTOR
Otto E. Fishburn
BY Harness & Harris
ATTORNEYS.

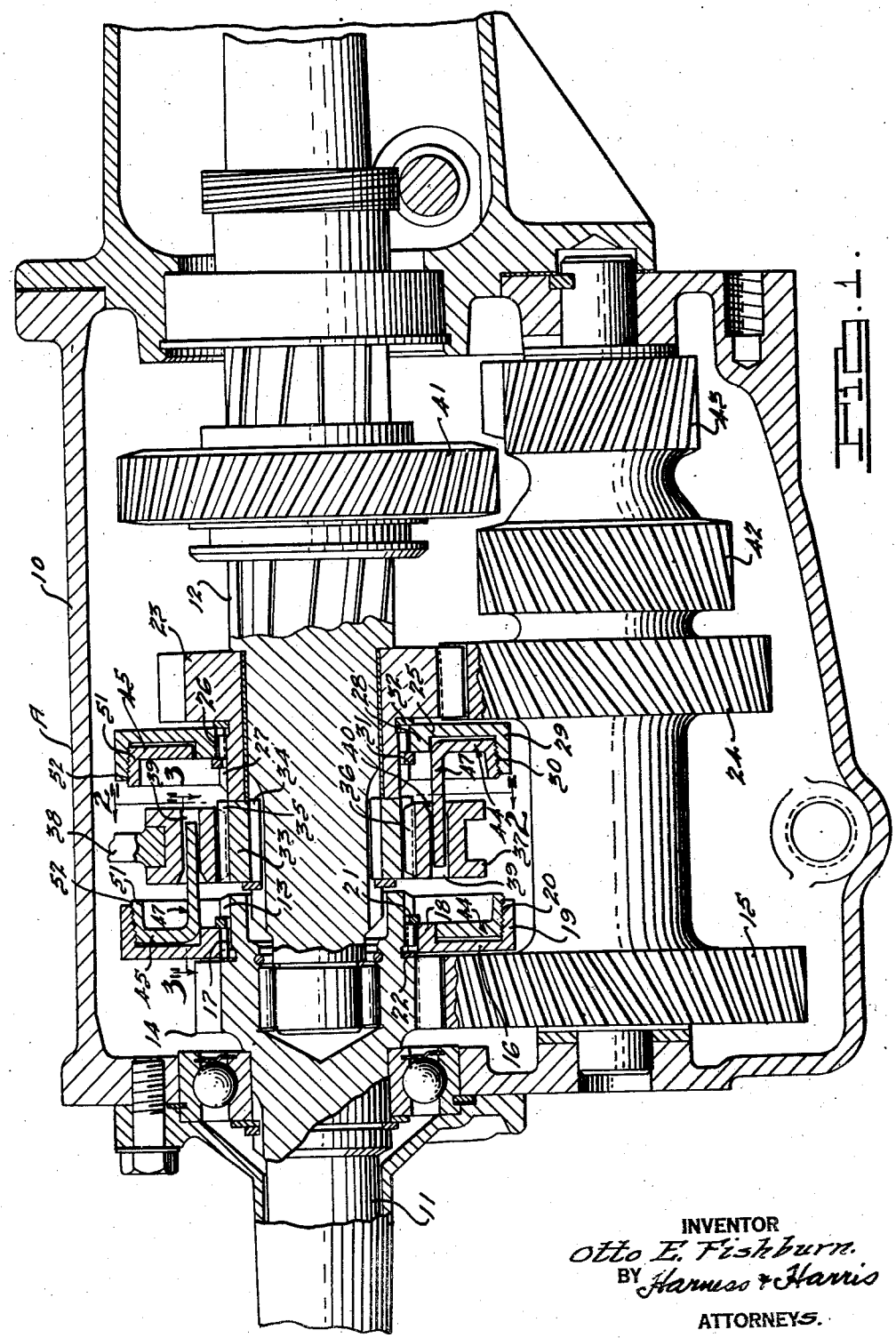

Patented Mar. 26, 1946

2,397,344

UNITED STATES PATENT OFFICE 2,397,344

SYNCHRONIZER MECHANISM

Otto E. Fishburn, Detroit, Mich., assignor to Chrysler Corporation, Highland Park, Mich., a corporation of Delaware Application May 19, 1944, Serial No. 536,313

9 Claims. (Cl. 192—53)

This invention relates to improvements in clutch control means of the type particularly adapted to facilitate engagement of positive clutch elements.

In power transmitting mechanisms of the type having positively engageable rotating clutching elements it is desirable that such elements be disposed as near as possible to the axis of rotation to provide a minimum peripheral speed and thus facilitate clutching engagement thereof. The invention provides in an arrangement embodying the foregoing advantage an improved control member coacting with the rotatable structures to respectively block and accommodate thereof, although the invention in its broader aspects is not necessarily limited to a mechanism embodying the foregoing advantage.

Another object of the invention is the provision, in conjunction with rotatable structures adapted for positive clutching engagement, of an improved arrangement for establishing a synchronizing driving connection between such structures to facilitate clutching engagement thereof and particularly embodying a good lever advantage in effecting synchronization.

Another object of the invention is the provision of a clutching control member characterized by its simplicity of design and economy of manufacture, to the extent that the same may and preferably comprises a single sheet metal body.

Other objects and advantages of the invention will be more apparent from the following description taken in connection with the accompanying drawings, wherein:

Fig. 1 is a longitudinal sectional view illustrating a power transmitting mechanism embodying the invention.

Fig. 2 is a side elevational view, partly in section, taken on the line 2—2 of Fig. 1.

Fig. 3 is a top plan view, partly in section, taken on line 3—3 of Fig. 1.

Fig. 4 is a view illustrating a piece of stock from which the control member is fabricated.

Figs. 5 and 6 are views illustrating progressive fabrication of the control member from the Fig. 4 stock.

Fig. 7 is a view in perspective of the control member.

The invention is illustrated in a power transmitting mechanism A including a casing 10, a driving shaft 11 and a driven shaft 12 journalled in and coaxial with the latter. Driven with the shaft 11 is a set of clutch teeth 13 and gear teeth 14 in constant mesh with the teeth of a countershaft gear 15. Encircling the shaft 11 is a member 16 having a central opening through which the shaft extends and teeth 17 at the opening in driving engagement with the clutch teeth 13, the member 16 defining in cross section, as shown in Fig. 1, a channel including inner and outer flanges 18 and 19, respectively, the latter having a friction clutching surface 20 on the inner periphery thereof. The member 16 rotates with shaft 11 and is retained in axial position relative thereto between a snap ring 21 and a shim 22, the latter being between the ends of the teeth 17 and an adjacent shoulder of shaft 11.

A gear 23 is journalled on shaft 12 and is in constant mesh with a countershaft gear 24. Encircling the reduced portion of gear 23 is a member 25 having a central opening receiving this reduced portion and teeth 26 drivingly engaged with a set of clutching teeth 27 formed on the reduced portion of gear 23. The member 25 structurally corresponds to the member 16, being channel shaped in cross section as shown in Fig. 1, and including the inner and outer flanges 28 and 29, respectively, the latter having a friction clutching surface 30 on the inner periphery thereof. The member 25 is driven with gear 23 and is retained axially relatively thereto by a snap ring 31 and a shim 32 between the ends of teeth 27 and an adjacent shoulder of gear 23.

A hub 33 is splined as at 34 on shaft 12 and has external teeth 35 in constant mesh with internal teeth 36 of a sleeve 37 shiftable axially by a fork 38. The sleeve is provided with a first and second set of axially extending circumferentially spaced openings 39 and 40, respectively, the openings of the set 39 being alternately arranged with respect to the openings of the set 40. Each opening 39, 40 is provided by communicating drilled openings and can be economically produced by a multiple drill operation. That edge of each opening of the set 39 adjacent the teeth 13 is bevelled and each opening of the set 40 has its edge adjacent the teeth 27 correspondingly bevelled.

The sleeve 37 is shiftable to the left as viewed in Fig. 1 to engage the teeth thereof with the teeth 13 and provide a direct drive between shafts 11 and 12, and is shiftable to the right to engage the teeth thereof with the teeth 27 and establish a second speed ratio drive. A third speed ratio drive can be provided by shifting the gear 41, splined on shaft 12, axially to mesh with the countershaft gear 42, and the reverse drive can be provided by engaging a suitable reverse idler, not shown, with gear 41 and countershaft gear 43.

The invention is particularly directed to facilitating clutching of the sleeve 37 with the teeth 13 and 27 and for this purpose there are provided structurally similar control members 44, one thereof coacting with the sleeve 37 and the structure driven with shaft 11 and the other coacting with the sleeve and the structure driven with the gear 23, a typical control member 44 being shown in Fig. 7. Each control member 44 is mounted in the channel defined by the associated member 16, 29 and includes an end wall 45, disposed radially in the Fig. 1 assembly, and having a central opening 46 receiving the flange 18 of the associated channel. Projecting from the wall 45 adjacent the opening 46 are a plurality of flanges 47, three in number being shown, the flanges of the control member associated with the driving structure including shaft 11 extending respectively into the openings 39 in the sleeve 11, and the flanges of the control member associated with the gear 23 extending respectively into the openings 40, forming a driving connection in each instance between the members 45 and sleeve 37. As shown more particularly in Fig. 3, each flange has an end 48 portion of reduced width, a portion 49 of increased width, and a connecting portion tapered in the direction of the length of the flange to provide opposed cam faces 50 registering with the bevelled edge of the associated opening when the sleeve 37 is in its neutral position as shown in Fig. 1. Each flange 47 has clearance with its associated opening to accommodate relative rotation between each member 44 and the sleeve 37.

Projecting from the radially outer extremity of the wall 45 and in the same direction as the flanges 47 is a peripheral flange or rim 51 having a friction clutching surface 52 on the outer periphery thereof registering with an associated friction clutching surface 20, 30, each friction surface 52 having left hand threads. Supporting of the members 44 in the respective channels plus the presence of an oil film between the associated registering friction clutching surface tends to cause each member 44 to rotate with its associated member 16, 29 and due to the relative different speeds of the latter and the sleeve 37 prior to clutching engagement therebetween a cam face 50 of each flange 47 is brought into engagement with the bevelled edge of its associated opening 39, 40 and thus each control member 44 is energized to the extent that each flange 47 is so positioned that a cam face 50 is disposed in the path of axial clutching shift of the sleeve 37. As a further means for insuring such energization a plurality of coil springs 53 extend through respective openings in the sleeve 37, each having the opposite ends thereof respectively abutting the end walls 45 of the members 44 and exerting a sufficient axial pressure thereon to thrust the associated registering friction clutching surfaces into relatively light frictional engagement thereby insuring energization as aforesaid.

In a typical shift of the sleeve 37, for example, to clutch with the teeth 13, cam face 50 of each flange 47 exerts combined axial and rotative thrust components against the member 44 to thereby place a pair of associated frictional clutching surfaces 20, 52 under relatively heavy engagement thus easing the structures to be clutched to approximately the same speed and permitting engagement of the clutching teeth without clashing. The flanges 47 telescope within the sleeve 37 during such clutching shift, the rotative clearance of the driving connection accommodating relative rotation of the sleeve and flanges 47 into registering relation for such telescoping when the relatively heavy synchronizing engagement is established between the associated friction clutching surfaces. In normal operation each member 44 has a running bearing clearance with its associated member 16, 29.

Each member 45 is formed from an annular sheet metallic stock 54 shown in Fig. 4, which is stamped into cup shape as shown in Fig. 5, and providing the peripheral flange 51 and end wall 45. Portions of the end wall 45 are then removed by a suitable die operation providing the driving flanges 47 and forming the Fig. 6 structure. The flanges 47 are then deflected to their Fig. 7 position. The outer periphery of the flange 51 is machined and threaded to provide the friction clutching surface 52.

The associated friction clutching surfaces are cone-shaped and the diameter of the members 16, 29 are sufficient to provide a good leverage action for bringing the structures to approximately the same speed. This advantage in conjunction with the relatively low peripheral speed of the clutching teeth attained by disposing the same near the axis of rotation facilitates the clutching engagement. Furthermore, the mechanism is compact, the overall dimension being otherwise lessened due to the fact that the sleeve 37 can move to a position between the flange 51 and the clutch teeth 13 or clutch teeth 26 for clutching therewith.

Although but one specific embodiment of the invention has herein been shown and described, it will be understood that various changes in the size, shape and arrangement of parts may be made without departing from the spirit of the invention.

I claim:

1. In a power transmitting mechanism comprising rotatable structures adapted to be positively clutched, one of said structures including clutch teeth and a portion defining a channel opening axially having an internal friction clutching surface, the other of said structures including a toothed member axially shiftable to clutch with the first mentioned teeth; and a friction clutch element including a radially extending body, a flange integral with and extending axially in a direction from the outer edge of said body having an external friction clutching surface engageable with the first mentioned friction clutching surface, and a plurality of flanges integral with and extending axially in said direction from the inner edge of said body part drivingly connected with said other structure for rotation relative thereto between a first position in thrust transmitting engagement with said member for urging said surfaces into frictional clutching engagement during clutching shift of said member and a second position out of thrust transmitting engagement as an incident to completion of clutching shift of said member.

2. In a power transmitting mechanism including rotatable structures adapted to be positively clutched, one of said structures comprising a set of clutch teeth and a friction surface disposed radially outwardly from said clutch teeth, the other of said structures comprising a member having a set of clutch teeth and being axially shiftable to clutch the teeth thereof with the teeth of the first mentioned set, said member having a plurality of circumferentially spaced axially extending openings, a blocker member including a generally radially extending wall having selected portions thereof removed to provide a plurality of circumferentially spaced fingers, said fingers being deflected laterally in one direction from said wall and respectively projecting with rotative clearance into said openings to drivingly connect said members while accommodating rotation of said fingers between first and second positions respectively blocking and accommodating clutching shift of said shiftable member, said blocker member including a peripheral rim deflected laterally from said wall and disposed radially outwardly from said fingers and having a friction surface engaged with the first mentioned surface to rotate said fingers to said blocking position when said structures are rotating at relatively different speeds.

3. In a power transmitting mechanism including rotatable structures, one of said structures comprising clutch teeth and a friction clutching surface spaced radially outwardly from said teeth, the other of said structures including a toothed member shiftable axially to clutchingly engage the teeth thereof with the first mentioned teeth; and a rotatable synchronizing member coacting with said structures to facilitate said clutching engagement, said synchronizing member including an axially extending rim having a friction clutching surface on the external periphery thereof adapted to be urged into synchronizing engagement with the first friction surface, a flange extending axially in the same direction as said rim drivingly connected with said other structure for limited relative rotation therebetween and having a portion thereof disposed for thrust transmitting engagement with said shiftable member when said structures are rotating at relatively different speeds to thereby urge said friction surfaces into synchronizing engagement during clutching shift of said member, said rim and flange being so spaced radially as to accommodate movement of at least a portion of the shiftable member therebetween to effect clutching of said teeth.

4. In a power transmitting mechanism including rotatable structures, one of said structures comprising clutch teeth and a friction clutching surface spaced radially outwardly from said teeth, the other of said structures including a toothed member shiftable axially to clutchingly engage the teeth thereof with the first mentioned teeth; and a rotatable synchronizing member coacting with said structures to facilitate said clutching engagement, said synchronizing member including an end wall, a flange at the radial outer extremity of said wall integral therewith and extending in an axial direction therefrom, said flange having a friction clutching surface adapted to be urged into synchronizing engagement with the first friction surface, a plurality of flanges at the radial inner extremity of said wall integral therewith extending in said axial direction and drivingly connected with said other structure for limited relative rotation therebetween, a portion of each of said plurality of flanges being disposed for thrust transmitting engagement with said shiftable member when said structures are rotating at relatively different speeds to thereby urge said friction surfaces into synchronizing engagement during clutching shift of said member.

5. In a power transmitting mechanism including rotatable structures, one of said structures comprising clutch teeth and including a portion defining a channel opening axially and having a friction clutching surface on the internal periphery thereof, the other of said structures including a toothed member shiftable axially to clutchingly engage the teeth thereof with the first mentioned teeth; and a rotatable synchronizing member coacting with said structures to facilitate said clutching engagement and having an end portion mounted in said channel, said synchronizing member including an end wall, a flange at the radial outer extremity of said wall integral therewith and extending in an axial direction therefrom, said flange having a friction clutching surface on the external periphery thereof adapted to be urged into synchronizing engagement with the first friction surface, a plurality of flanges at the radial inner extremity of said wall integral therewith extending in said axial direction and drivingly connected with said other structure for limited relative rotation therebetween, a portion of each of said plurality of flanges being disposed for thrust transmitting engagement with said shiftable member when said structures are rotating at relatively different speeds to thereby urge said friction surfaces into synchronizing engagement during clutching shift of said member.

6. In a synchronizing member for facilitating clutching of rotatable structures having positively engageable clutch teeth, a one-piece sheet metal member including an annular end wall having a central opening therethrough, flanges adjacent said opening extending laterally from said end wall in one direction adapted to drivingly engage with one of said structures, and an annular flange at the periphery of said end wall remote from said opening extending in said one direction and adapted to frictionally engage the other of said structures to form a frictional driving connection between the latter structure and said member.

7. In a power transmitting mechanism including rotatable structures having clutch teeth positively engageable by shift of one of said structures, a control member for facilitating clutching of said structures including a generally radially disposed body, a plurality of circumferentially spaced fingers deflected laterally from an edge of said body connected with said one structure for limited rotation relative thereto between positions respectively blocking and accommodating clutching shift of said one structure, and a rim deflected laterally from the other edge of said body having a frictional connection with the other of said structures to thereby rotate said fingers to said blocking position, said fingers when in blocking position being disposed for thrust transmitting engagement with said one structure to thereby establish synchronizing engagement of said frictional connection during clutching shift of said one structure.

8. In a synchronizer for facilitating clutching of rotatable structures having positively engageable clutching teeth, a one-piece sheet metal member including a wall, selected portions of said wall being removed to provide thereby a plurality of fingers, said fingers being deflected from said wall and being adapted to engage one of said structures with rotative clearance therebetween and to receive a synchronizing thrust therefrom, said wall having a peripheral portion deflected laterally therefrom and adapted to transmit to the other of said structures the synchronizing thrust received by said fingers as aforesaid.

9. In a synchronizer for facilitating clutching of rotatable structures having positively engageable clutching teeth, a one-piece sheet metal member including a wall, selected portions of said wall being removed to provide thereby a plurality of fingers, said fingers being deflected laterally in one direction relative to said wall and being adapted to receive a synchronizing thrust from one of said structures, and a flange deflected laterally from said end wall in said one direction adapted to transmit to the other of said structures the synchronizing thrust received by said fingers.

OTTO E. FISHBURN.